US012618688B2

(12) United States Patent　　　(10) Patent No.: US 12,618,688 B2
Kaida et al.　　　　　　　　　　(45) Date of Patent: May 5, 2026

(54) INFORMATION PROCESSING DEVICE AND INFORMATION PROCESSING METHOD FOR VEHICLE CHARGING AT CHARGING FACILITIES

(71) Applicant: TOYOTA JIDOSHA KABUSHIKI KAISHA, Toyota (JP)

(72) Inventors: Yuto Kaida, Nagoya (JP); Shinya Hirosawa, Nisshin (JP); Hikaru Sugahara, Gifu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/032,868

(22) Filed: Jan. 21, 2025

(65) Prior Publication Data

US 2025/0237525 A1　　Jul. 24, 2025

(30) Foreign Application Priority Data

Jan. 24, 2024　(JP) ................................. 2024-008778

(51) Int. Cl.
　G01C 21/36　　　(2006.01)
(52) U.S. Cl.
　CPC ..... G01C 21/3682 (2013.01); G01C 21/3614 (2013.01); G01C 21/3697 (2013.01)
(58) Field of Classification Search
　CPC ............ G01C 21/3682; G01C 21/3614; G01C 21/3697
See application file for complete search history.

(56) References Cited

U.S. PATENT DOCUMENTS

| 2012/0109519 | A1* | 5/2012 | Uyeki ..................... | B60L 53/68 |
| | | | | 701/426 |
| 2019/0383637 | A1* | 12/2019 | Teske ................. | G01C 21/3676 |
| 2020/0317080 | A1* | 10/2020 | Jeon ....................... | G06Q 10/20 |
| 2023/0152108 | A1* | 5/2023 | Vreeland ............ | G01C 21/3469 |
| | | | | 701/420 |
| 2023/0230062 | A1* | 7/2023 | Lee .......................... | B60L 53/65 |
| | | | | 705/39 |
| 2024/0123859 | A1* | 4/2024 | Yang ..................... | B60L 53/665 |

FOREIGN PATENT DOCUMENTS

JP　　　2021-063766 A　　4/2021

OTHER PUBLICATIONS

Moghaddam, Valeh, et. al., "Dispatch management of portable charging stations in electric vehicle networks", 2021, eTransportation, vol. 8, 100112 (Year: 2021).*

* cited by examiner

*Primary Examiner* — Jeff Zimmerman
*Assistant Examiner* — Wayne S. Murray
(74) *Attorney, Agent, or Firm* — Dinsmore & Shohl LLP

(57)　　　　ABSTRACT
A control unit of an information processing device searches for a charging facility that is included in one or more facilities located on a planned travel route of a user vehicle and is either one or both of a facility that has charging equipment and a facility to which a charging vehicle for charging the user vehicle is dispatched. The control unit of the information processing device outputs display information for displaying charging facility information on whether the user vehicle can be charged at the charging facility, which has been searched for, on a schematic diagram on which information on the one or more facilities is displayed in order of proximity to the current position of the user vehicle.

4 Claims, 6 Drawing Sheets

FIG. 4

| FACILITY INFORMATION | | | | |
|---|---|---|---|---|
| FACILITY ID | LOCATION | EQUIPMENT ID | GENRE | AVAILABLE CHARGING TIME |
| | | *** | RESTROOM | — |
| | | *** | RESTAURANT | — |
| *** | *** | *** | INFORMATION CENTER | — |
| | | *** | CHARGING EQUIPMENT | *** |
| | | ... | ... | ... |
| | | *** | CHARGING EQUIPMENT | — |
| ... | ... | ... | ... | ... |

FIG. 5

DISPATCH INFORMATION

| CHARGING VEHICLE ID | FACILITY ID | SERVICE PROVIDING PERIOD | AVAILABLE CHARGING TIME |
|---|---|---|---|
| *** | *** | *** | *** |
| ... | ... | ... | ... |
| *** | *** | *** | — |

FIG. 6

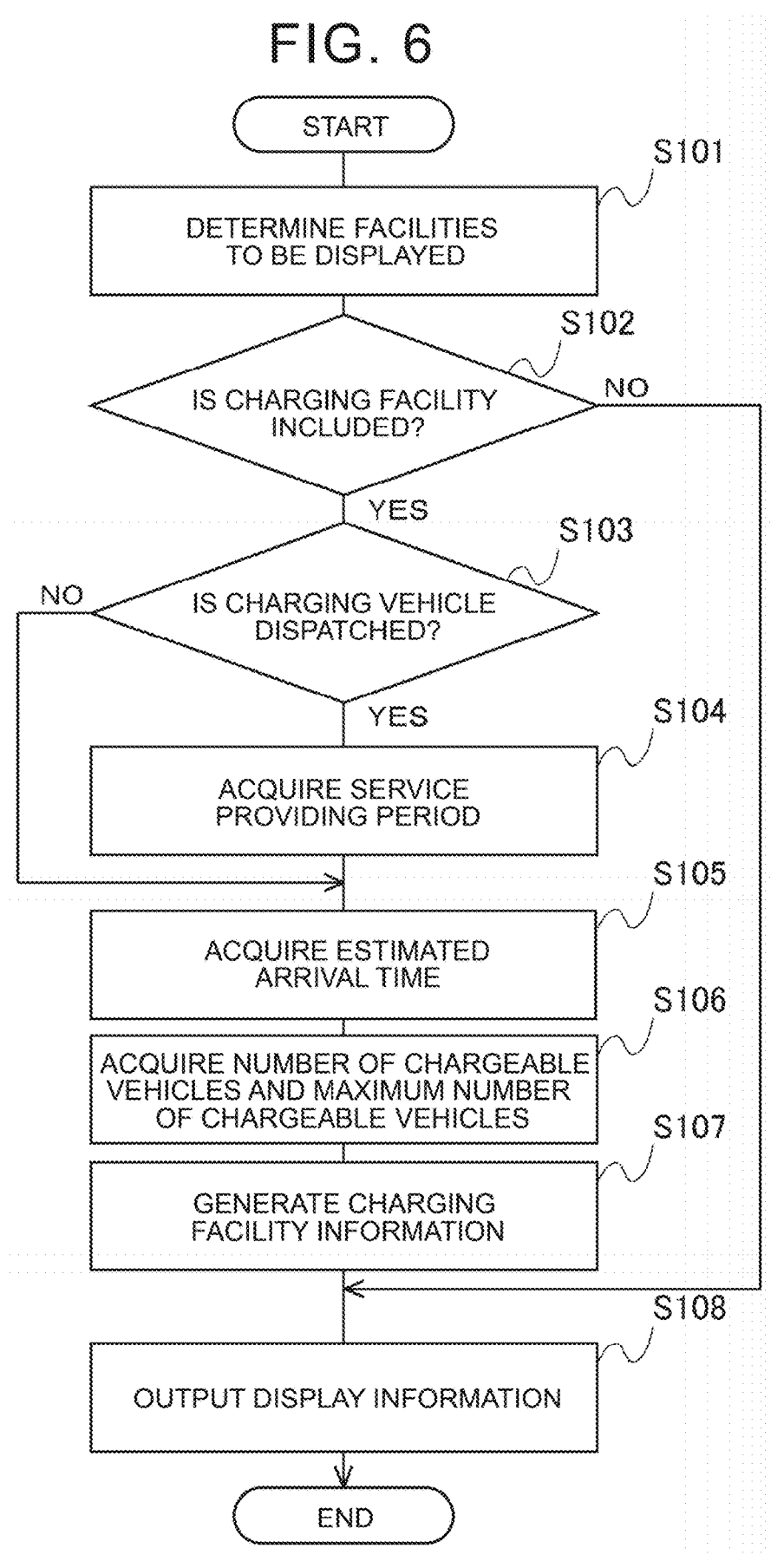

START

S101

DETERMINE FACILITIES
TO BE DISPLAYED

S102

IS CHARGING FACILITY
INCLUDED?

NO

YES

S103

IS CHARGING VEHICLE
DISPATCHED?

NO

YES

S104

ACQUIRE SERVICE
PROVIDING PERIOD

S105

ACQUIRE ESTIMATED
ARRIVAL TIME

S106

ACQUIRE NUMBER OF CHARGEABLE
VEHICLES AND MAXIMUM NUMBER
OF CHARGEABLE VEHICLES

S107

GENERATE CHARGING
FACILITY INFORMATION

S108

OUTPUT DISPLAY INFORMATION

END

INFORMATION PROCESSING DEVICE AND INFORMATION PROCESSING METHOD FOR VEHICLE CHARGING AT CHARGING FACILITIES

CROSS-REFERENCE TO RELATED APPLICATION

This application claims priority to Japanese Patent Application No. 2024-008778 filed on Jan. 24, 2024. The disclosure of the above-identified application, including the specification, drawings, and claims, is incorporated by reference herein in its entirety.

BACKGROUND

1. Technical Field

The present disclosure relates to an information processing device and an information processing method.

2. Description of Related Art

Japanese Unexamined Patent Application Publication No. 2021-63766 (JP 2021-63766 A) discloses a navigation system. The navigation system acquires a remaining battery life and battery charging characteristics. The navigation system also acquires the locations of charging spots and the attributes of charging spots. After that, the navigation system suggests a route to a driver including charging spots that are selected based on the remaining battery life, battery charging characteristics, locations of charging spots, and attributes of charging spots.

SUMMARY

It is an object the present disclosure to display easy-to-read information on whether a vehicle can be charged at charging facilities.

A first aspect of the present disclosure relates to an information processing device including a control unit. The control unit is configured to perform searching for a charging facility and outputting display information on a schematic diagram. The charging facility is a facility included in one or more facilities located on the planned travel route of a user vehicle and is either one or both of a facility that has charging equipment and a facility to which a charging vehicle for charging the user vehicle is dispatched. The display information is information for displaying charging facility information on whether the user vehicle can be charged at the charging facility that has been searched for. The schematic diagram is a diagram on which information on the one or more facilities is displayed in order of proximity to the current position of the user vehicle.

A second aspect of the present disclosure relates to an information processing method executed by a computer. The information processing method includes searching for a charging facility and outputting display information on a schematic diagram. The charging facility is a facility included in one or more facilities located on the planned travel route of a user vehicle and is either one or both of a facility that has charging equipment and a facility to which a charging vehicle for charging the user vehicle is dispatched. The display information is information for displaying charging facility information on whether the user vehicle can be charged at the charging facility that has been searched for. The schematic diagram is a diagram on which information on the one or more facilities is displayed in order of proximity to the current position of the user vehicle.

The present disclosure makes it possible to display easy-to-read information on whether a vehicle can be charged at charging facilities.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a diagram showing an example of the table configuration of facility information stored in a facility information database;

FIG. 5 is a diagram showing an example of the table configuration of dispatch information stored in a dispatch information database; and FIG. 6 is a flowchart of processing performed by a control unit.

DETAILED DESCRIPTION OF EMBODIMENTS

Figure 1:
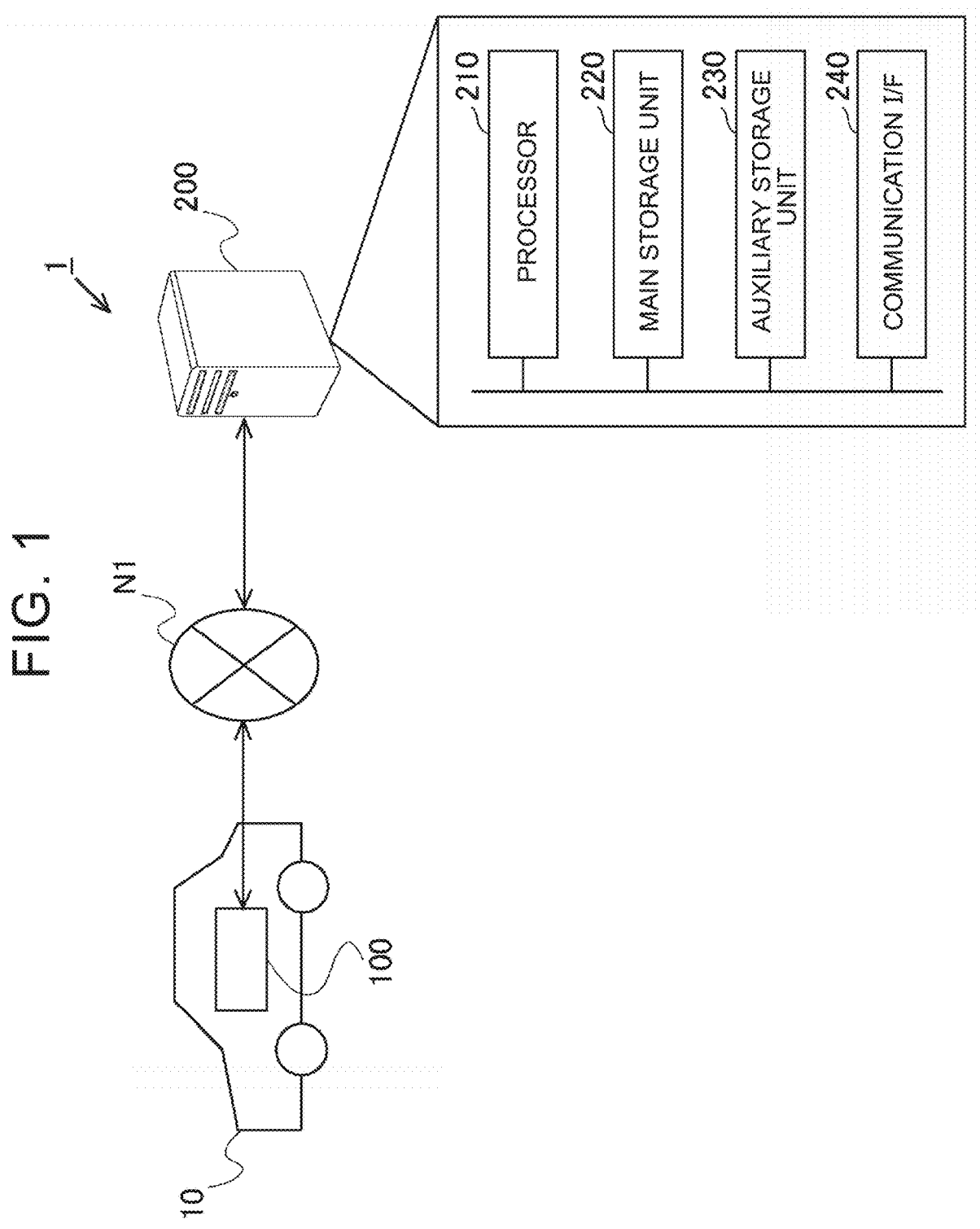
FIG. 1 is a diagram showing a schematic configuration of a navigation system.

The user who wants to charge a user vehicle visits a facility where the user vehicle can be charged (hereinafter sometimes referred to as a "charging facility"). In this case, when charging equipment is provided at the charging facility, the user vehicle can be charged at the charging facility. In addition, when a vehicle that charges user vehicles (hereinafter sometimes referred to as a "charging vehicle") is dispatched to the charging facility, the user vehicle can be charged at the charging facility.

In this case, the user can look at the information on charging facilities displayed on the navigation system to obtain information on the charging facilities (information including the locations of charging facilities and whether a vehicle can be charged at the charging facilities).

It is assumed here that the locations of charging facilities are displayed superimposed on a map displayed by the navigation system. It is also assumed that whether a vehicle can be charged at charging facilities is displayed superimposed on the map together with the locations of charging facilities. In this case, information other than the information on charging facilities may also be displayed on the map. In addition, since the distance between the user vehicle and charging facilities changes as the user vehicle moves, the positional relationship between the user vehicle and charging facilities on the map may change. In addition, as the user vehicle moves, the display range of the map may change and, as the orientation of the user vehicle changes, the display of the map may rotate accordingly. This means that the information on the charging facilities, when displayed superimposed on the map as described above, may reduce the visibility of the information on the charging facilities due to a change in the positional relationship with the charging facilities and a change in the display status of the map. The information processing device according to a first aspect of the present disclosure solves such problems.

A control unit of the information processing device according to a first aspect of the present disclosure is configured to search for a charging facility. The charging facility is a facility included in one or more facilities located on the planned travel route of a user vehicle and is either one or both of a facility that has charging equipment and a facility to which a charging vehicle for charging the user vehicle is dispatched. In addition the control unit is configured to output display information on a schematic diagram. The display information is the information for displaying charging facility information on whether the user vehicle can be charged at the charging facility that has been searched for. The schematic diagram mentioned above is a schematic diagram on which the information on the one or more facilities is displayed in order of proximity to the current position of the user vehicle.

As described above, the information processing device outputs the display information for displaying the charging facility information on the schematic diagram. The user can look at the schematic diagram to obtain the information one or more facilities on the planned travel route in order of proximity to the current position of the user vehicle. At this time, the user can also obtain the charging facility information on the schematic diagram. Therefore, the user can obtain the information on whether the user vehicle can be charged at each of the facilities that can be visited in order of proximity to the current location of the user vehicle. This makes it possible to improve the visibility of the charging facility information on whether a vehicle can be charged at a charging facility, compared to the case where the information on whether a vehicle can be charged at a charging facility is displayed superimposed on the map. In this way, the information on whether a vehicle can be charged at a charging facility can be displayed in an easy-to-read manner.

In the description below, specific embodiments of the present disclosure will be described with reference to the drawings. Unless otherwise noted, the hardware configuration, module configuration, functional configuration, etc. described in each embodiment are not intended to limit the technical scope of the disclosure.

EMBODIMENTS

System Overview

A navigation system 1 in this embodiment will be described with reference to FIG. 1 and FIG. 2. FIG. 1 is a diagram showing a schematic configuration of the navigation system 1. The navigation system 1 includes an in-vehicle device 100 and a server 200. In the navigation system 1, the in-vehicle device 100 and the server 200 are interconnected by a network N1. The network N1 may be, for example, a wide area network (WAN), which is a world-wide public communication network such as the Internet, or a telephone communication network such as that for mobile phones.

In-Vehicle Device

The in-vehicle device 100 is a car navigation system mounted in a vehicle 10. The vehicle 10 is a battery electric vehicle. The user of the vehicle 10 enters a destination into the in-vehicle device 100. The in-vehicle device 100 sends the current position of the vehicle 10 and the destination information indicating the destination to the server 200 via the network N1. After that, the in-vehicle device 100 receives the planned travel route of the vehicle 10, from the current position (starting point) to the destination, from the server 200 via the network N1. The in-vehicle device 100 displays the planned travel route of the vehicle 10 on the display superimposed on the map.

In this embodiment, it is assumed that the vehicle 10 is traveling on an expressway. FIG. 2 is a diagram showing an example of the display screen of the in-vehicle device 100. As shown in FIG. 2, the in-vehicle device 100 displays the map of the planned travel route of the vehicle 10 on the left side of the screen.

Figure 2:
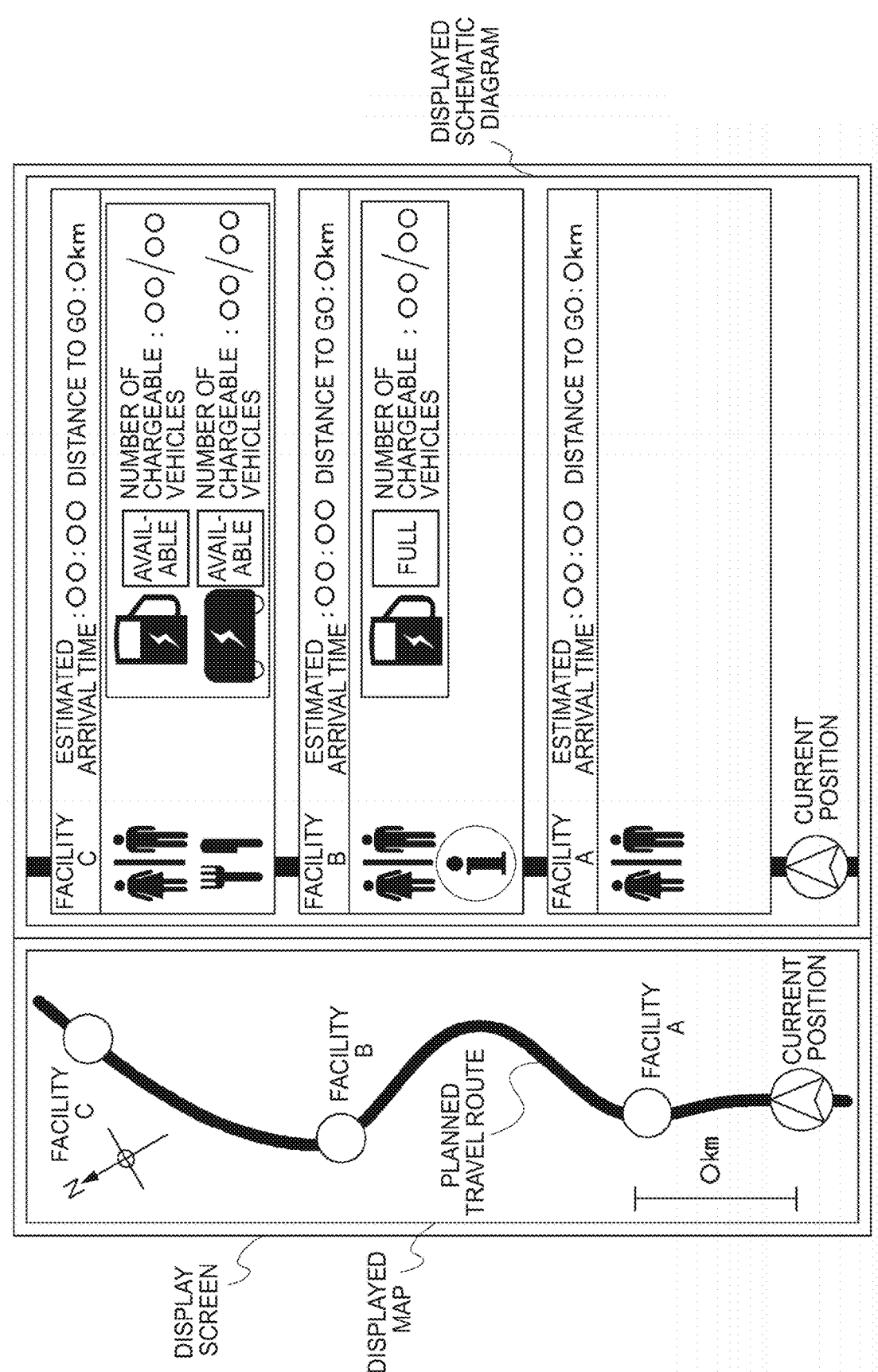
FIG. 2 is a diagram showing an example of the display screen of an in-vehicle device.

In this example, there are facility A, facility B, and facility C on the planned travel route of the vehicle 10 in order of proximity to the current position of the vehicle 10 as shown in FIG. 2. Each facility (facility A, facility B, and facility C) is a rest area, such as a service area or a parking area, on an expressway. On the map displayed by the in-vehicle device 100 (hereinafter sometimes referred to as a "displayed map"), the location of each facility is displayed. The user of the vehicle 10 can look at the map showing the planned travel route of the vehicle 10, displayed on the displayed map, to obtain information on the location of each facility.

At the bottom left of the displayed map, the scale of the displayed map is displayed. At the top left of the displayed map, the direction symbol is displayed. At the bottom of the displayed map, the icon indicating the current position is displayed. In this embodiment, the icon indicating the current position always points upward. That is, when the orientation of the vehicle 10 changes, the displayed map rotates accordingly so that the icon indicating the current position points upward. Displaying the displayed map in this way allows the user of the vehicle 10 to obtain information on the direction, right of left, of the next curve. When it is necessary to change the display range of the displayed map as the vehicle 10 moves, the display magnification of the displayed map on the in-vehicle device 100 may be changed.

Note that the vehicle 10 may sometimes need to be charged while moving to the destination. In this case, the user of the vehicle 10 wants to move to a facility that has charging equipment and/or to a facility where a charging vehicle is dispatched (hereinafter, such a facility is sometimes referred to as a "charging facility"). The charging equipment mentioned here refers to equipment (charger) that is used for charging a vehicle. The charging vehicle mentioned here refers to a vehicle that is used for charging a vehicle and that is temporarily dispatched to a facility depending on the number of users at the facility. At this time, the user of the vehicle 10 looks at the display screen of the in-vehicle device 100 for the information on the locations of charging facilities. For this reason, the location information on the charging facilities is useful to the user of the vehicle 10.

In addition, it takes time to charge a battery electric vehicle. Therefore, when another vehicle is using the charging service, the user of the vehicle 10 who wants to charge the vehicle 10 may not charge the vehicle 10 immediately. This means that the information on whether a vehicle can be charged at a charging facility is also useful for the user of the vehicle 10.

To address the need described above, the in-vehicle device 100 displays the information on the locations of charging facilities, and whether a vehicle can be charged at a charging facility, on the display screen. At this time, it is assumed that the in-vehicle device 100 displays the locations of charging facilities superimposed on the displayed map. It is also assumed that the in-vehicle device 100 displays whether a vehicle can be charged at charging facilities, as well as the locations of charging facilities, superimposed on the displayed map.

It is assumed here that facility B and facility C are charging facilities. In the example shown in FIG. 2, it is assumed, for example, that the information that charging equipment is provided and whether a vehicle can be charged at facility B is displayed below the display of "facility B" on the displayed map. In the example shown in FIG. 2, it is assumed, for example, that the information that charging equipment is provided, that a charging vehicle is dispatched, and whether a vehicle can be charged at facility C is displayed below the display of "facility C" on the displayed map.

Note that the displayed map includes the information on facility A that is not a charging facility. The scale of the displayed map and the direction symbol are also displayed. That is, the information on facility A that is unrelated to the charging facilities (facility B and facility C) and the information such as map symbols are also displayed on the displayed map. In addition, since the distance to the charging facilities becomes shorter as the vehicle 10 moves, the positional relationship between the current position of the vehicle 10 and the charging facilities on the displayed map changes. As described above, when the orientation of the vehicle 10 changes as the vehicle 10 moves, the displayed map rotates accordingly. The display range of the map also changes as the vehicle 10 moves. That is, when the information on the locations of charging facilities and the information on whether a vehicle can be charged at a charging facility are displayed superimposed on the displayed map, unnecessary information unrelated to these pieces of information is displayed, or the display position of these pieces of information on the display screen changes as the vehicle moves. Therefore, to visually confirm the information on the locations of charging facilities and on whether a vehicle can be charged at a charging facility, the user is sometimes required to pay close attention to the displayed map.

In such a case, since the user of the vehicle 10 is driving, it difficult to pay close attention to the displayed map. In addition, the vehicle 10 is traveling on an expressway in this embodiment. This means that the distance traveled by the vehicle 10 while the user of the vehicle 10 is looking at the screen is larger than when the vehicle 10 is traveling on a general road. In this case, the distance traveled by the vehicle 10 during the time when the user of the vehicle 10 is not concentrating on driving becomes larger than when the vehicle 10 is traveling on a general road. Therefore, it is not suitable to superimpose the information about the locations of the charging facilities, and whether a vehicle can be charged at a charging facility, on the displayed map.

On the other hand, as shown in FIG. 2, the in-vehicle device 100 displays a schematic diagram of the planned travel route of the vehicle 10 on the right side on the display screen. The schematic diagram of the planned travel route of the vehicle 10 (hereinafter sometimes referred to as a "displayed schematic diagram"), displayed by the in-vehicle device 100, is a schematic diagram on which the information on one or more facilities is displayed in order of proximity to the current position of the vehicle 10. In the example shown in FIG. 2, the information on three facilities is divided into blocks, one block for each facility. In the description below, the information on facilities displayed on the displayed schematic diagram (hereinafter sometimes referred to as "displayed facilities") may be referred to as "displayed-facility information." The displayed-facility information on the facilities is displayed from bottom to top in order of proximity to the current position of the vehicle 10.

In the example shown in FIG. 2, the displayed-facility information on "facility A", which is the facility nearest to the current position of the vehicle 10, is displayed at the bottom of the displayed schematic diagram. In the example shown in FIG. 2, the displayed-facility information on "facility B", which is the second nearest facility from the current position of the vehicle 10, is displayed at the second lowest position of the displayed schematic diagram. In the example shown in FIG. 2, the displayed-facility information on "facility C", which is the third nearest facility from the current position of the vehicle 10, is displayed at the top of the displayed schematic diagram.

The displayed-facility information, displayed on the schematic diagram by the in-vehicle device 100, includes the information indicating the facility name, estimated arrival time to the facility, and distance to the facility. In the example shown in FIG. 2, the information indicating the facility name, estimated arrival time to the facility, and distance to the facility for each facility is displayed in the upper part of the displayed-facility information on each facility.

In addition, as the displayed-facility information, the information indicating services available at a facility is also displayed. In the example shown in FIG. 2, as the displayed-facility information for facility A, an icon (pictogram) indicating that a restroom is provided is displayed. In the example shown in FIG. 2, as the displayed-facility information for facility B, icons indicating that a restroom, an information center, and charging equipment are provided are displayed. In the example shown in FIG. 2, as the displayed-facility information for facility C, icons indicating that a restroom, a restaurant, charging equipment, and a charging vehicle are provided are dispatched.

When charging equipment is provided in a facility, the information on whether a vehicle can be charged by the charging equipment is displayed in the displayed-facility information in the displayed schematic diagram. The information on whether a vehicle can be charged by the charging equipment is displayed by an icon ("Available" icon or "Full" icon) indicating whether the charging equipment at the charging facility is available for use. In addition, as the information on whether a vehicle can be charged by charging equipment, the number of vehicles that the charging equipment can charge at the charging facility (number of chargeable vehicles) is displayed. This information allows the user of the vehicle 10 to obtain information on the availability of charging equipment.

Along with the number of chargeable vehicles, the maximum number of vehicles (capacity) that the charging equipment can charge at the charging facility is also displayed. The maximum number of vehicles can be charged by the charging equipment at the charging facility (hereinafter sometimes referred to as the "maximum number of chargeable vehicles") depends on the number of units of charging equipment installed at the facility. In this embodiment, it is assumed that one unit of charging equipment can charge one vehicle. Note that one unit of charging equipment may be able to charge a plurality of vehicles. In the example shown in FIG. 2, the number of chargeable vehicles and the maximum number of chargeable vehicles are displayed as a fraction (the numerator is the number of chargeable vehicles and the denominator is the maximum number of chargeable vehicles). The display of this fraction allows the user of the vehicle 10 to obtain information on the installation scale of charging equipment at the charging facility.

When a charging vehicle is dispatched to a facility, the information on whether a vehicle can be charged by the charging vehicle is displayed in each piece of displayed-facility information in the displayed schematic diagram. The information on whether a vehicle can be charged by the charging vehicle is displayed by an icon ("Available" icon or "Full" icon) indicating whether the charging vehicle at the charging facility is available for use. In addition, as the information on whether a vehicle can be charged by the charging vehicle, the number of vehicles that the charging vehicle can charge at the charging facility (number of chargeable vehicles) is displayed. Along with the number of chargeable vehicles, the maximum number of vehicles that the charging vehicle can charge at the charging facility (maximum number of chargeable vehicles) is also displayed. The number of chargeable vehicles that can be charged by the charging vehicle at a charging facility depends on the number of charging vehicles dispatched to the facility. In this embodiment, it is assumed that one charging vehicle can charge one vehicle. Note that one charging vehicle may be able to charge a plurality of vehicles.

The displayed-facility information on each facility, displayed on the displayed schematic diagram in this way, allows the user of the vehicle 10 to obtain information on the order of facilities that can be visited by moving on the planned travel route. That is, when the user of the vehicle 10 wants to visit facility C, the user can obtain information that it is only necessary to pass facility A and facility B and then to visit the facility on the planned travel route. In addition, the information on charging equipment and charging vehicles, displayed as described above on the displayed schematic diagram, allows the user of the vehicle 10 to quickly obtain information on which facility is a charging facility. At this time, the user of the vehicle 10 can also quickly obtain information on whether a vehicle can be charged at the charging facility. The display of the number of chargeable vehicles also allows the user of the vehicle 10 to obtain information on the number of available units of charging equipment and charging vehicles.

In some cases, all of the charging equipment or charging vehicles are being used. In this case, it can be assumed that the number of other vehicles with a shorter remaining charging time is larger when the number units of charging equipment or the number of charging vehicles is larger than when the number of units of charging equipment or the number of charging vehicles is smaller. Therefore, it can be assumed that the larger the number of units of charging equipment or the number of charging vehicles, the shorter the time until charging equipment or a charging vehicle becomes available. Thus, displaying the maximum number of chargeable vehicles allows the user of the vehicle 10 to make a plan to visit a charging facility with a larger maximum number of chargeable vehicles in preference to a charging facility with a smaller maximum number of chargeable vehicles.

In the displayed schematic diagram, the information on whether a vehicle can be charged by charging facilities is displayed in an easy to view manner using icons. In addition, in the displayed schematic diagram, the position at which each piece of displayed-facility information is displayed remains unchanged until the vehicle 10 passes the facility nearest to the current location. Therefore, the display positions of the information on the facilities are likely to remain unchanged compared to the case when the information on the locations of charging facilities and on whether a vehicle can be charged at a charging facility is displayed on the displayed map. This display therefore reduces the possibility that the user overlooks the information on the locations of charging facilities and on whether a vehicle can be charged at a charging facility.

Server

The server 200 is a server device that manages the traveling of vehicles. The server 200 receives destination information from the in-vehicle device 100 via the network N1. The server 200 generates a planned travel route for the vehicle 10 in accordance with the destination information and sends route information, including a planned travel route, to the in-vehicle device 100. This enables the in-vehicle device 100 to display the planned travel route on the displayed map.

The server 200 searches for facilities to be displayed. In addition, the server 200 searches for facilities to be displayed where charging equipment is installed. The server 200 also searches for facilities to be displayed where a charging vehicle is dispatched. That is, the server 200 identifies charging facilities from among the display facilities that have been searched for. Then, according to the search result, the server 200 generates the display information to be used by the in-vehicle device 100 for displaying the displayed schematic diagram and sends the generated display information to the in-vehicle device 100 via the network N1. This enables the in-vehicle device 100 to display the displayed schematic diagram. The method for the server 200 to generate the display information will be described later in detail.

The server 200 includes a computer having a processor 210, a main storage unit 220, an auxiliary storage unit 230, and a communication interface (communication I/F) 240. The processor 210 is, for example, a central processing unit (CPU) or a digital signal processor (DSP). The main storage unit 220 is, for example, a random access memory (RAM). The auxiliary storage unit 230 is, for example, a read only memory (ROM). The auxiliary storage unit 230 is, for example, a hard disk drive (HDD) or a disc recording medium such as a CD-ROM, a DVD disc, or a Blu-ray disc. The auxiliary storage unit 230 may also be a removable medium (portable storage medium). Examples of removable medium include a USB memory and an SD card. The communication I/F 240 is, for example, a local area network (LAN) interface board or a wireless communication circuit for wireless communication.

In the server 200, the auxiliary storage unit 230 stores an operating system (OS), various programs, various information tables, etc. In the server 200, the processor 210 loads a program from the auxiliary storage unit 230 into the main storage unit 220 for execution to implement various functions that will be described later. Note that some or all of the functions in the server 200 may be implemented by a hardware circuit such as an ASIC or an FPGA. Also note the server 200 does not necessarily need to be implemented by a single physical configuration and may be configured by a plurality of computers that cooperate with each other. Like the server 200, the in-vehicle device 100 also includes a computer.

Functional Configuration

Figure 3:
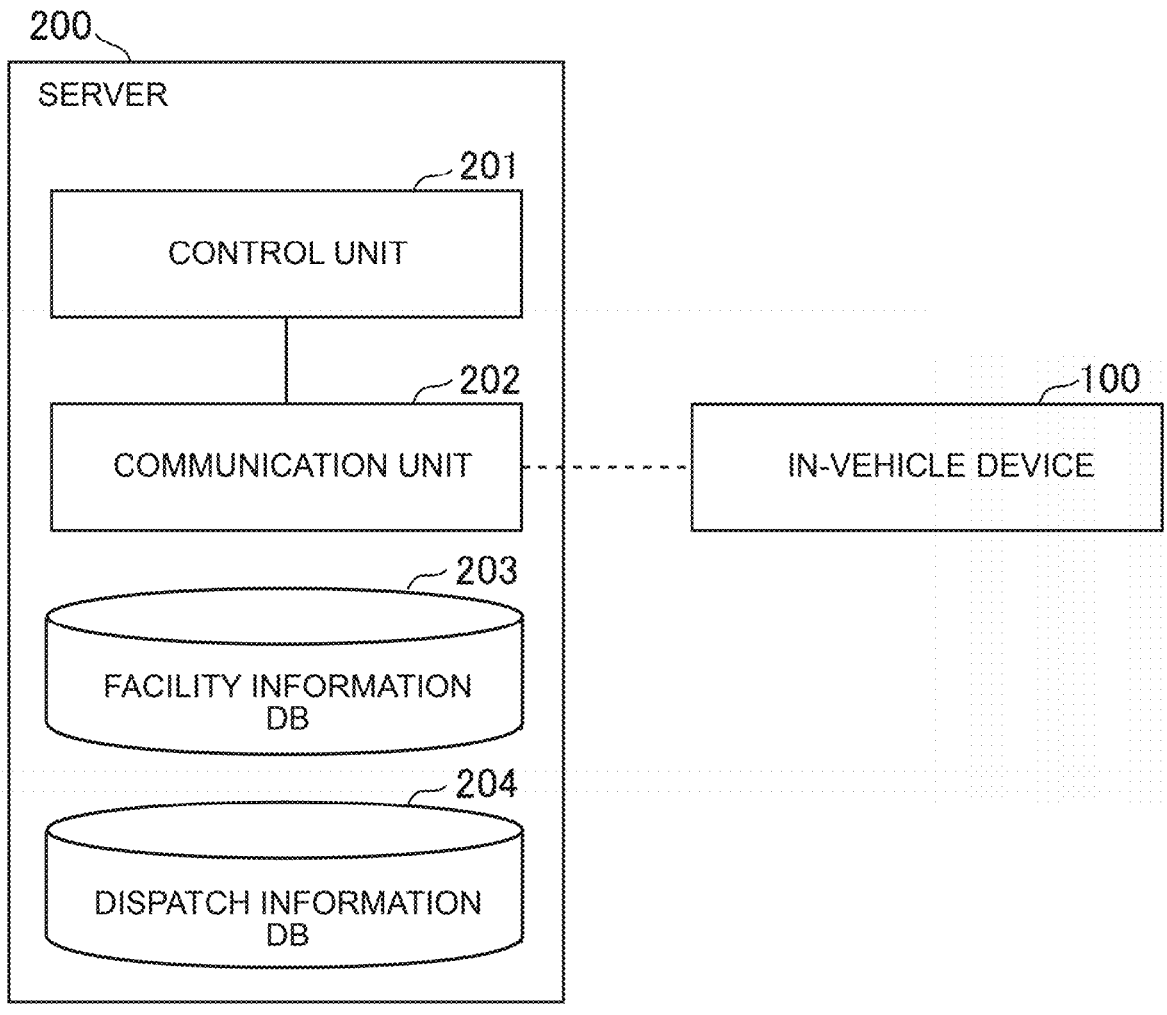
FIG. 3 is a block diagram schematically showing an example of the functional configuration of a server in an embodiment.

Next, the functional configuration of each of the in-vehicle device 100 and the server 200, which configure the navigation system 1 in this embodiment, will be described with reference to FIG. 3 to FIG. 5. FIG. 3 is a block diagram schematically showing an example of the functional configuration of the server 200 in this embodiment.

Server

The server 200 includes a control unit 201, a communication unit 202, a facility information database 203 (facility information DB 203), and a dispatch information database 204 (dispatch information DB 204). The control unit 201 has a function to perform calculation processing for controlling the server 200. The control unit 201 can be implemented by the processor 210 included in the server 200. The communication unit 202 has a function to connect the server 200 to the network N1. The communication unit 202 can be implemented by the communication I/F 240 included in the server 200.

The facility information DB 203 has a function to store facility information. The facility information is the information on the facilities located on an expressway. The facility information DB 203 can be implemented by the auxiliary storage unit 230 included in the server 200. FIG. 4 is a diagram showing an example of the table configuration of facility information stored in the facility information DB 203.

As shown in FIG. 4, the facility information has a Facility ID field, a Location field, an Equipment ID field, a Genre field, and an Available Charging Time field. The Facility ID field stores an identifier (facility ID) for identifying a facility. The Location field stores the information indicating the location of the facility with the corresponding facility ID. The Equipment ID field stores an identifier for identifying equipment provided in the facility with the corresponding facility ID.

The Genre field stores the information indicating a genre to which the equipment with the corresponding equipment ID belongs. In the example shown in FIG. 4, the Genre field stores the information indicating a "Restroom", a "Restaurant", an "Information Center", and "Charging Equipment." As shown in FIG. 4, when multiple units of charging equipment are provided, the information indicating "Charging Equipment" is stored in multiple Genre fields. The Available Charging Time field stores the information indicating a time at which, when the charging equipment is currently charging a vehicle, the charging equipment becomes available again for charging another vehicle (that is, the time at which the current vehicle charging will end). When the charging equipment is not being used for charging a vehicle and is currently available for charging, the Available Charging Time field stores the information "---."

The control unit 201 can acquire the facility the information, stored in the facility information DB 203, to obtain information on facilities on the expressway. The control unit 201 can also acquire the facility information to obtain information on the equipment provided in each facility. The control unit 201 can also acquire the facility information to obtain information on the chargeable time of a charging facility.

The dispatch information DB 204 has a function to store dispatch information. The dispatch information is the information on charging vehicles dispatched to facilities on an expressway. The dispatch information DB 204 can be implemented by the auxiliary memory unit 230 included in the server 200. FIG. 5 is a diagram showing an example of the table configuration of dispatch information stored in the dispatch information DB 204. As shown in FIG. 5, the dispatch information DB 204 has a Charging Vehicle ID field, a Facility ID field, a Service Providing Period field, and an Available Charging Time field.

The Charging Vehicle ID field stores an identifier (charging vehicle ID) for identifying a charging vehicle. The Facility ID field stores the facility ID of a facility to which the charging vehicle with the corresponding charging vehicle ID is dispatched. The Service Providing Period field stores the information indicating a period (providing period) during which the charging vehicle with the corresponding charging vehicle ID provides the charging service to a vehicle at the facility with the corresponding facility ID. The service providing period is determined, for example, by a period (time slot) during which the charging vehicle is dispatched. The Available Charging Time field stores the information indicating the time at which, when the charging vehicle is currently charging a vehicle, the charging vehicle becomes available again to charge another vehicle (that is, the time at which the current vehicle charging will end). When the charging vehicle is not being used for charging a vehicle and is currently available for charging, the Available Charging Time field stores the information "---."

The control unit 201 can acquire the dispatch information, stored in the dispatch information DB 204, to obtain the information on the facilities to which charging vehicles are dispatched. The control unit 201 can also acquire the dispatch information to obtain the information on the service providing period, and the available charging time, of charging vehicles.

The control unit 201 searches for facilities (facilities to be displayed) on the planned travel route of the vehicle 10. More specifically, the control unit 201 refers to the location of each of the facilities, included in the facility information stored in the facility information DB 203, and the planned travel route of the vehicle 10 to identify the facilities on the planned travel route of the vehicle 10 as the display facilities to be displayed.

In addition, the control unit 201 searches for charging facilities. More specifically, the control unit 201 refers to the facility information stored in the facility information DB 203 and, from among the facilities to be displayed, identifies facilities each with the facility ID that includes the information "Charging Equipment" in the corresponding Genre field as charging facilities. In addition, the control unit 201 refers to the dispatch information stored in the dispatch information DB 204 and identifies display facilities to which a charging vehicle is to be dispatched as charging facilities.

In addition, the control unit 201 refers to the start time of the vehicle 10 and the planned travel route of the vehicle 10 to calculate a time when the vehicle 10 is expected to arrive at a charging facility (hereinafter, sometimes referred to as the "estimated arrival time"). The start time of the vehicle 10 is identified, for example, by the sending time of the route information.

When the charging facility is a facility where charging equipment is provided, the control unit 201 refers to the facility information, stored in the facility information DB 203, to identify the number of chargeable vehicles and the maximum number of chargeable vehicles by the charging equipment in the charging facility. More specifically, the control unit 201 refers to the facility information and acquires the number of Available Charging Time fields each of which corresponds to the Genre field in which "Charging Equipment" is stored and each of which stores therein "---." The control unit 201 also acquires the number of units of charging equipment having an available charging time that will come before the estimated arrival time of the vehicle 10. Then, the control unit 201 identifies the sum of these numbers as the number of chargeable vehicles. In addition, the control unit 201 refers to the facility information and acquires the number of Genre fields of a charging facility each of which stores "Charging Equipment" as the maximum number of chargeable vehicles by the charging equipment in the charging facility.

When the charging facility is a facility where a charging vehicle is dispatched, the control unit 201 refers to the dispatch information, stored in the dispatch information DB 204, to identify the number of chargeable vehicles and the maximum number of chargeable vehicles by the charging vehicles in the charging facility. More specifically, the control unit 201 refers to the dispatch information and determines the sum of the number of Available Charging Time fields each of which stores "---" and the number of charging vehicles having an available charging time that will come before the estimated arrival time of the vehicle 10 as the number of chargeable vehicles. In addition, the control unit 201 refers to the dispatch information and acquires the number of charging vehicles dispatched to the charging facility as the maximum number of chargeable vehicles in the charging facility.

Next, the control unit 201 generates the charging facility information based on the acquired number of chargeable vehicles and the maximum number of chargeable vehicles. When the charging facility is a facility where charging equipment is provided, the charging facility information includes the information indicating whether a vehicle can be charged by the charging equipment. When the charging facility is a facility where a charging vehicle is dispatched, the charging facility information includes the information indicating whether a vehicle can be charged by the charging vehicle. When the charging facility is a facility where charging equipment is provided and, in addition, a charging vehicle is dispatched, the charging facility information includes the information indicating whether a vehicle can be charged by the charging equipment and the charging vehicle. More specifically, the charging facility information is the information indicating whether a vehicle can be charged by charging equipment and/or a charging vehicle, the number of chargeable vehicles by the charging equipment and/or the charging vehicle, and the maximum number of chargeable vehicles by the charging equipment and/or the charging vehicle.

In determining whether a vehicle can be charged, the control unit 201 determines that charging equipment or a charging vehicle can charge the vehicle when the number of chargeable vehicles by the charging equipment or the charging vehicle is one or more. When the number of chargeable vehicles by the charging equipment or the charging vehicle is zero, the control unit 201 determines that the charging equipment or the charging vehicle cannot charge the vehicle.

In some cases, the time when the vehicle 10 arrives at a charging facility where a charging vehicle is dispatched may be outside the service providing period of the charging vehicle. In such a case, even if the vehicle 10 visits the charging facility, the vehicle 10 cannot be charged by the charging vehicle. To address this problem, when the estimated arrival time to a charging facility where a charging vehicle is dispatched is included in the service providing period, the control unit 201 generates the charging facility information indicating that the charging facility is a charging facility where a charging vehicle is dispatched. On the other hand, when the estimated arrival time to a charging facility where a charging vehicle is dispatched is not included in the service providing period, the control unit 201 does not generate the charging facility information indicating that the charging facility is a charging facility where a charging vehicle is dispatched. In other words, when the estimated arrival time to a charging facility where a charging vehicle is dispatched is not included in the service providing period, the control unit 201 excludes the charging facility from the charging facilities for which charging facility information indicating that a charging vehicle is dispatched is generated.

In some cases, a plurality of charging vehicles may be dispatched to a charging facility. In this case, the control unit 201 acquires the service providing period for each of the charging vehicles dispatched to the charging facility and, based on the service providing period of each of the charging vehicles and the estimated arrival time of the vehicle 10, determines a charging vehicle to be excluded from the generation of the charging facility information.

After that, the control unit 201 outputs the display information to the in-vehicle device 100 according to the charging facility information. When charging equipment is provided in a charging facility, the display information includes the information for causing the in-vehicle device 100 to display an icon indicating that charging equipment is provided. At this time, when charging equipment for charging is available, the display information includes the information for causing the in-vehicle device 100 to display the "Available" icon. On the other hand, when charging equipment for charging is not available, the display information includes the information for causing the in-vehicle device 100 to display the "Full" icon. The display information also includes the information for causing the in-vehicle device 100 to display the number of chargeable vehicles and the maximum number of chargeable vehicles in the charging facility.

When a charging vehicle is dispatched to a charging facility, the display information includes the information for causing the in-vehicle device 100 to display an icon indicating that the charging vehicle is dispatched. At this time, the display information includes the information for causing the in-vehicle device 100 to display the "Available" or "Full" icon depending on whether a vehicle can be charged. The display information also includes the information for causing the in-vehicle device 100 to display the number of chargeable vehicles and the maximum number of chargeable vehicles in the charging facility.

When the estimated arrival time to a charging facility where a charging vehicle is dispatched is not included in the service providing period, the charging facility information indicating that a charging vehicle is dispatched is not generated as described above. Therefore, when the charging facility is a charging facility where the estimated arrival time of the vehicle 10 is not included in the service providing period of a charging vehicle, the display information does not include the information for displaying an icon indicating that a charging vehicle is dispatched.

Flowchart

Next, the processing performed by the control unit 201 of the server 200 in the navigation system 1 will be described with reference to FIG. 6. FIG. 6 is a flowchart of the processing performed by the control unit 201. The processing shown in FIG. 6 is the processing for outputting the display information to the in-vehicle device 100. The processing shown in FIG. 6 is started when the control unit 201 generates a planned travel route for the vehicle 10.

In the processing shown in FIG. 6, first in S101, the control unit 201 refers to the planned travel route of the vehicle 10 and the facility information, stored in the facility information DB 203, to determine facilities to be displayed. Next, in S102, the control unit 201 determines whether a charging facility is included in the facilities to be displayed. When the determination result in S102 is negative, there is no charging facility on the planned travel route of the vehicle 10. Therefore, in S108, the control unit 201 generates the display information that does not include the information on charging facilities and outputs (sends) the generated display information to the in-vehicle device 100. In doing so, the control unit 201 refers to the facility information and outputs the display information including the information for displaying icons for services that are not charging services provided by charging equipment and charging vehicles but are available in the facilities to be displayed.

When the determination result in S102 is affirmative, the control unit 201 determines in S103 whether a charging vehicle is dispatched to the charging facility. More specifically, the control unit 201 refers to the dispatch information, stored in the dispatch information DB 204, to determine whether the facility ID of the charging facility is stored in the Facility ID field. An affirmative determination result in step S103 means that a charging vehicle is dispatched to the charging facility. In this case, the control unit 201 refers to the dispatch information in S104 to acquire the service providing period of the charging vehicle at the charging facility.

Next, in S105, the control unit 201 acquires the estimated arrival time of the vehicle 10 at the charging facility. Next, in S106, the control unit 201 acquires the number of chargeable vehicles and the maximum number of chargeable vehicles of the charging equipment and/or the charging vehicle. Next, in S107, the control unit 201 generates the charging facility information according to the number of chargeable vehicles and the maximum number of chargeable vehicles acquired in S106.

Next, in S108, the control unit 201 generates the display information according to the charging facility information and outputs (sends) the generated display information to the in-vehicle device 100. At this time, the control unit 201 outputs the display information that also includes the information for displaying the icons of services that are not the charging service and are available in the facility to be displayed. Then, the processing shown in FIG. 6 ends. Note that, when there is a plurality of charging facilities, the control unit 201 generates the charging facility information for each of the charging facilities and outputs the display information for the generated charging facility information to the in-vehicle device 100.

As described above, the navigation system 1 outputs the display information for displaying the charging facility information (displayed-facility information) on the displayed schematic diagram. The user of the vehicle 10 can look at the schematic diagram, which is displayed on the on-vehicle device 100, to obtain the charging facility information in order of proximity to the current position of the vehicle. Therefore, the user of the vehicle 10 can obtain the information on whether the vehicle 10 can be charged at each of the facilities that can be visited in order of proximity to the current location of the vehicle 10. This makes it possible to improve the visibility of the information on whether a vehicle can be charged at a charging facility, compared to the case where the information on whether a vehicle can be charged at a charging facility is displayed superimposed on the displayed map. In this way, the information on whether a vehicle can be charged at a charging facility can be displayed in an easy-to-read manner.

First Modification

In the embodiment described above, the display information is output when the vehicle 10 travels on an expressway. However, the vehicle 10 does not necessarily need to travel on an expressway. In the modification described below, the vehicle 10 travels on a general road.

In this modification, the server 200 acquires the facility information stored in the facility information DB 203. In this modification, the facility information is the information on a plurality of facilities within a predetermined area. In this modification, the facility information includes the information indicating the locations of charging stations within the predetermined area and the available charging times of charging equipment at the charging stations. The charging stations mentioned here refer to facilities where charging equipment is provided. Note that the facility information may also include the information on facilities belonging to categories other than charging stations, such as eating facilities, public facilities, commercial facilities, or accommodation facilities.

The server 200 refers to the facility information to identify charging stations on the planned travel route of the vehicle 10 as facilities to be displayed. At this time, the server 200 also identifies facilities belonging to categories other than charging stations as facilities to be displayed. In this case, the server 200 may limit the number of facilities that are identified as facilities to be displayed and that belong to categories other than charging stations to a predetermined number. The server 200 identifies charging stations that are facilities to be displayed and are charging stations as charging facilities. The server 200 refers to the dispatch information to identify facilities that are facilities to be displayed and to which a charging vehicle is dispatched as charging facilities. A facility to which a charging vehicle is dispatched may be a charging station or a facility belonging to a genre other than a charging station. In this way, the server 200 identifies charging facilities. After that, the server 200 generates the charging facility information on the charging facilities and outputs the display information to the in-vehicle device 100. In this way, too, the information on whether a vehicle can be charged at a charging facility on a general road can be displayed in an easy-to-read manner.

Second Modification

In the embodiment described above, the server 200 generates display information and outputs it to the in-vehicle device 100. On the other hand, in this modification, the in-vehicle device 100 generates display information. More specifically, the in-vehicle device 100 accesses the server 200 via the network N1 and refers to the facility information, stored in the facility information DB 203, and the dispatch information, stored in the dispatch information DB 204, to identify charging facilities. At this time, the in-vehicle device 100 acquires the available charging time, included in the facility information and the dispatch information, and the service providing period, included in the dispatch information, from the server 200. The in-vehicle device 100 also acquires the estimated arrival time to the charging facility from the route information.

After that, the in-vehicle device 100 generates charging facility information according to the available charging time included in the facility information and the dispatch information, the service providing period included in the dispatch information, and the estimated arrival time to a charging facility and outputs the display information to the user (displays the schematic diagram). In this way, too, the information on whether a vehicle can be charged at a charging facility can be displayed in an easy-to-read manner.

OTHER EMBODIMENTS

The above embodiments are merely exemplary and the present disclosure may be modified as necessary for implementation without departing from the spirit thereof. The processing and elements described in the present disclosure can be carried out in any combination as long as there is no technical contradiction.

The processing described as being performed by one device may be shared by a plurality of devices. Conversely, the processing described as being performed by different devices may be performed by one device. In a computer system, the hardware configuration (server configuration) that implements each function can be flexibly changed.

The present disclosure can also be realized by supplying a computer program implementing the functions in the above-described embodiments to a computer to cause one or more processors of the computer to read and execute the program. Such a computer program may be provided to the computer by a non-transitory computer-readable storage medium that can be connected to the system bus of the computer or may be provided to the computer via a network. The non-transitory computer-readable storage medium includes any type of disk, such as a magnetic disk (floppy (registered trademark) disk, hard disk drive (HDD), etc.) and an optical disc (CD-ROM, DVD disc, Blu-ray disc, etc.), and any type of medium suitable for storing electronic instructions such as a read only memory (ROM), a random access memory (RAM), an EPROM, an EEPROM, a magnetic card, a flash memory, and an optical card.

What is claimed is:

1. An information processing device comprising a control unit, the control unit configured to perform:
    searching for a charging facility, the charging facility being a facility included in one or more facilities located on a planned travel route of a user vehicle and being either one or both of a facility that has charging equipment and a facility to which a charging vehicle for charging the user vehicle is dispatched;
    outputting display information on a schematic diagram, the display information being information for displaying charging facility information on whether the user vehicle can be charged at the charging facility that has been searched for, the schematic diagram being a diagram on which information on the one or more facilities is displayed in order of proximity to a current position of the user vehicle; and
    outputting the display information displayed superimposed on a map including whether the vehicle can be charged at charging facilities is displayed superimposed on the map together with the locations of charging facilities, and as the user vehicle moves, the display range of the map changes and, as the orientation of the user vehicle changes, the display of the map rotates accordingly;
    when the charging facility is a facility to which the charging vehicle is dispatched, the control unit is further configured to:
    acquire a providing period during which the charging vehicle provides a charging service, and acquire an estimated arrival time of the user vehicle at the charging facility to which the charging vehicle is dispatched;
    when the estimated arrival time is included in the providing period, the charging facility is included in the charging facility information as a facility to which the charging vehicle is dispatched; and
    when the estimated arrival time is not included in the providing period, the charging facility is not included in the charging facility information as a facility to which the charging vehicle is dispatched.

2. The information processing device according to claim 1, wherein, when the charging equipment or the charging vehicle that is able to charge the user vehicle is not in the charging facility, the outputting display information includes outputting the display information that causes an icon to be displayed on the schematic diagram, the icon indicating that the charging equipment or the charging vehicle that is able to charge is not in the charging facility.

3. The information processing device according to claim 1, wherein the outputting display information includes outputting the display information that causes the number of chargeable vehicles by the charging equipment or the charging vehicle and the maximum number of chargeable vehicles by the charging equipment or the charging vehicle to be displayed on the schematic diagram.

4. An information processing method executed by a computer, the information processing method comprising:
    searching for a charging facility, the charging facility being a facility included in one or more facilities located on a planned travel route of a user vehicle and being either one or both of a facility that has charging equipment and a facility to which a charging vehicle for charging the user vehicle is dispatched;
    outputting display information on a schematic diagram, the display information being information for displaying charging facility information on whether the user vehicle can be charged at the charging facility that has been searched for, the schematic diagram being a diagram on which information on the one or more facilities is displayed in order of proximity to a current position of the user vehicle; and
    outputting the display information displayed superimposed on a map including whether the vehicle can be charged at charging facilities is displayed superimposed on the map together with the locations of charging facilities, and as the user vehicle moves, the display range of the map changes and, as the orientation of the user vehicle changes, the display of the map rotates accordingly;
    when the charging facility is a facility to which the charging vehicle is dispatched, acquiring a providing period during which the charging vehicle provides a charging service, and
    acquiring an estimated arrival time of the user vehicle at the charging facility to which the charging vehicle is dispatched;
    wherein:
        when the estimated arrival time is included in the providing period, the charging facility is included in the charging facility information as a facility to which the charging vehicle is dispatched; and
        when the estimated arrival time is not included in the providing period, the charging facility is not included in the charging facility information as a facility to which the charging vehicle is dispatched.

* * * * *